United States Patent

[11] 3,618,650

[72] Inventors Jacques Francois Robert Prouhet
 Le Clayes, Bois, Yvelines;
 Charles Gustave Amicel, Carrieres, Seine, Yvelines; Michel Jules Jacquot, Beynes, Yvelines; Pierre Baptistal, Paris; Roger Buvelot, Paris, all of France
[21] Appl. No. 844,143
[22] Filed July 23, 1969
[45] Patented Nov. 9, 1971
[73] Assignee Societe D'Interet Collectif Agricole March De Vente Aux Encheres Du Nord-Finistere Kerisnel Saint-Pol-de-Leon, Finistere-Nord, France
[32] Priorities July 26, 1968
[33] France
[31] 160,741;
 May 23, 1969, France, No. 6,916,926

[54] APPARATUS FOR PREPARING THE RECEPTACLES AND FRUITS OF BRACTATED PLANTS, MORE PARTICULARLY ARTICHOKES
23 Claims, 8 Drawing Figs.

[52] U.S. Cl. .................................................... 146/81, 146/52, 146/227
[51] Int. Cl. ........................................................ A23n 15/04
[50] Field of Search ............................................ 146/81, 83, 43, 52, 227

[56] References Cited
UNITED STATES PATENTS

| | | | |
|---|---|---|---|
| 2,217,679 | 10/1940 | Gray et al. | 146/81 X |
| 2,766,794 | 10/1956 | Odale | 146/43 X |
| 3,396,766 | 8/1968 | Perkins | 146/52 |

Primary Examiner—Willie G. Abercrombie
Attorney—Watson, Cole, Grindle & Watson

ABSTRACT: This invention relates to an apparatus for preparing the receptacles and fruits of bractated plants, more particularly artichoke bottoms, comprising a support for the receptacle; a blowing head for removing the leaves and the choke from the receptacle; sucker means for picking up the receptacle bottom from the support after such bottom has been cleaned by the blowing head; and machining means for removing irregularities in the shape of the bottom caused by removal of the leaves.

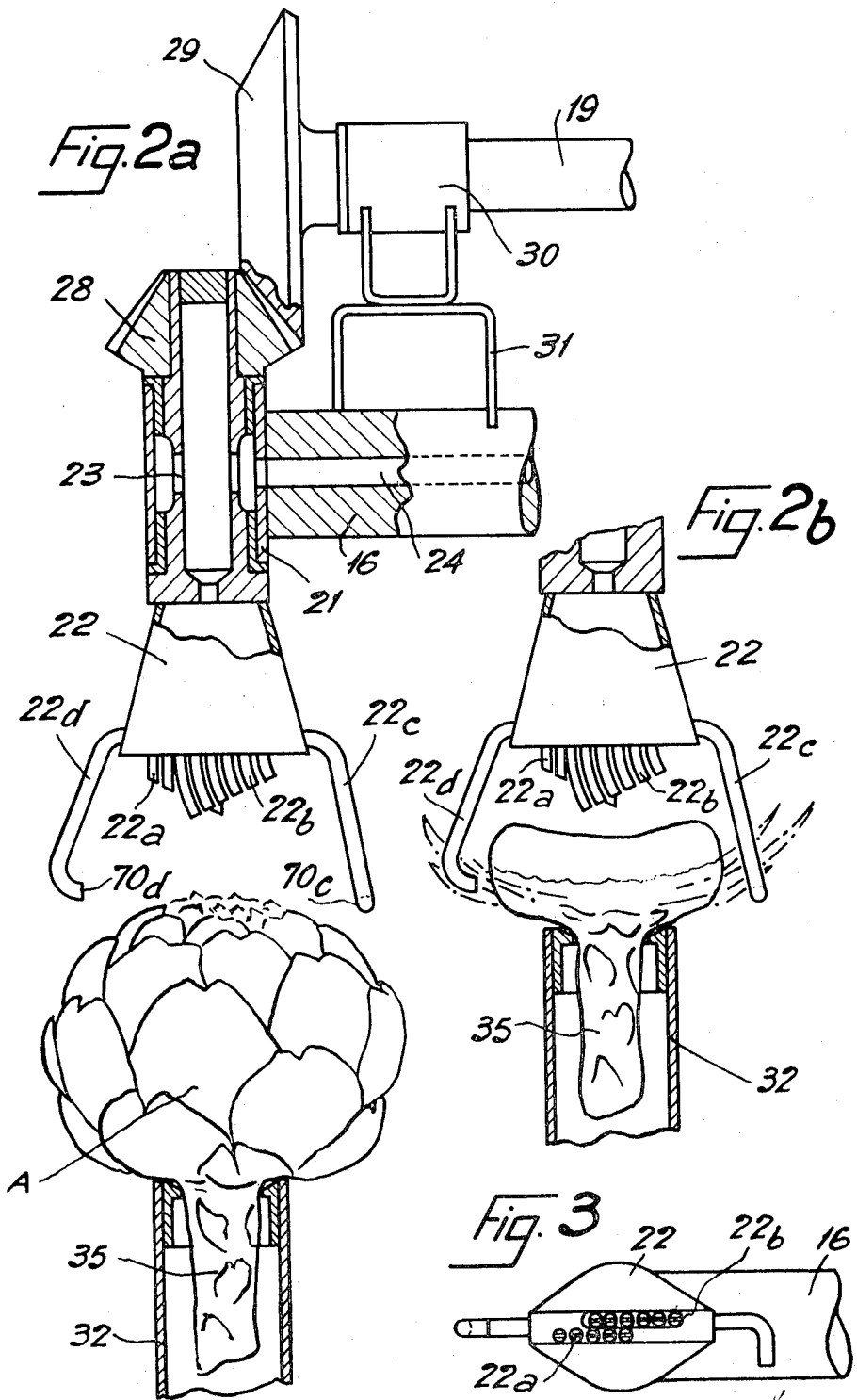

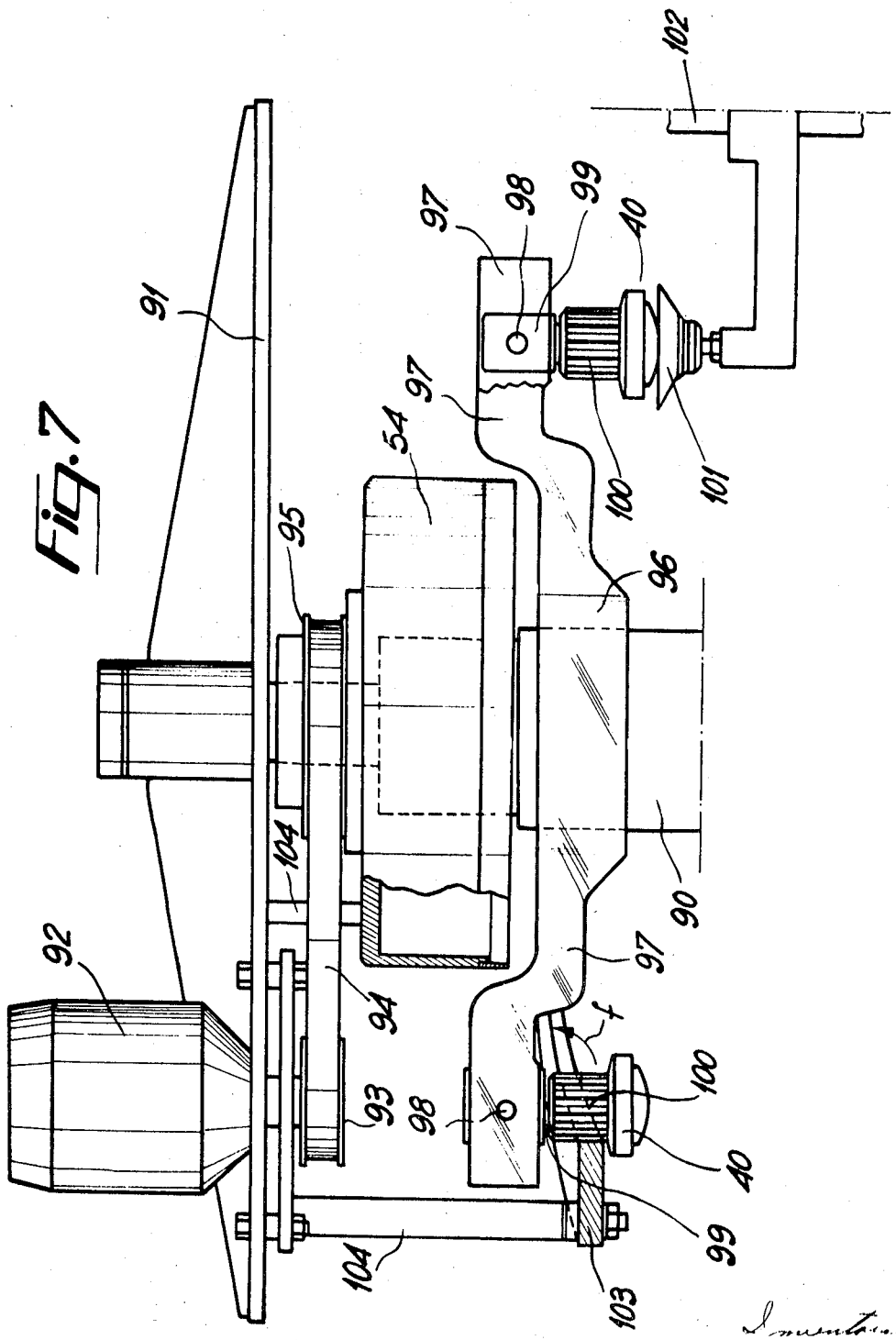

APPARATUS FOR PREPARING THE RECEPTACLES AND FRUITS OF BRACTATED PLANTS, MORE PARTICULARLY ARTICHOKES

This invention relates to apparatus for preparing the receptacles and fruits of bractated plants, more particularly artichokes, more particularly for packing.

According to the invention there is provided an apparatus for preparing the receptacles and fruits of bractated plants, more particularly artichoke bottoms, comprising a support for the receptacle, a blowing head for removing the leaves and the choke from the receptacle; sucker means for picking up the receptacle bottom from the support after such bottom has been cleaned by the blowing head, and machining means for removing irregularities in the shape of the bottom caused by removal of the leaves.

Preparation of the receptacles, such as artichoke bottoms, is preferably performed by an apparatus supplied with products which have, with advantage, been cooked beforehand for about half an hour.

There are two main phases of the preferred process:

In the first phase, all the leaves or bracts and the choke are removed by pressure-fluid jets, e.g. of air. The pressure fluid used can be air which is suitable for dealing with foodstuffs and which is completely free from oil and, where applicable, water vapor. Upon the completion of this step, a bottom still remains connected to the receptacle stem just as it does after a similar manual operation. The second phase is to "machine" the bottom—i.e. detach the stem, then turn the bottom exterior and bottom diameter to pare them externally and remove irregularities of shape arising from loss of the leaves plucked during the previous phase.

For maximum efficiency, the "machining" dimensions are, with advantage, determined on the basis of measurement of product diameter before machining. This measurement is converted by a slave system into a tool position instruction, the position of the tools determining the end product diameter. Products of any size can therefore be treated consecutively without previous sorting and with the maximum useful product being retained for each bottom, with no loss of natural appearance.

In order that the invention may be well understood there will now be described some embodiments thereof, given by way of example only, reference being had to the accompanying drawings, in which:

FIG. 2a is a sectioned view to a larger scale showing the blowing head used to pluck the artichokes during the first phase of the operation;

FIG. 2b is a view similar to FIG. 2a but at the end of the operation;

FIG. 3 is a view on the line III—III of the blowing head;

FIG. 7 is a view in elevation, with partial sectioning, of another variant.

To simplify the description hereinafter, the receptacles and fruits of a bractated plant will hereinafter be called "artichokes," but the process and apparatus according to the invention are not limited to artichokes and can be used for any similar products.

Figure 1:
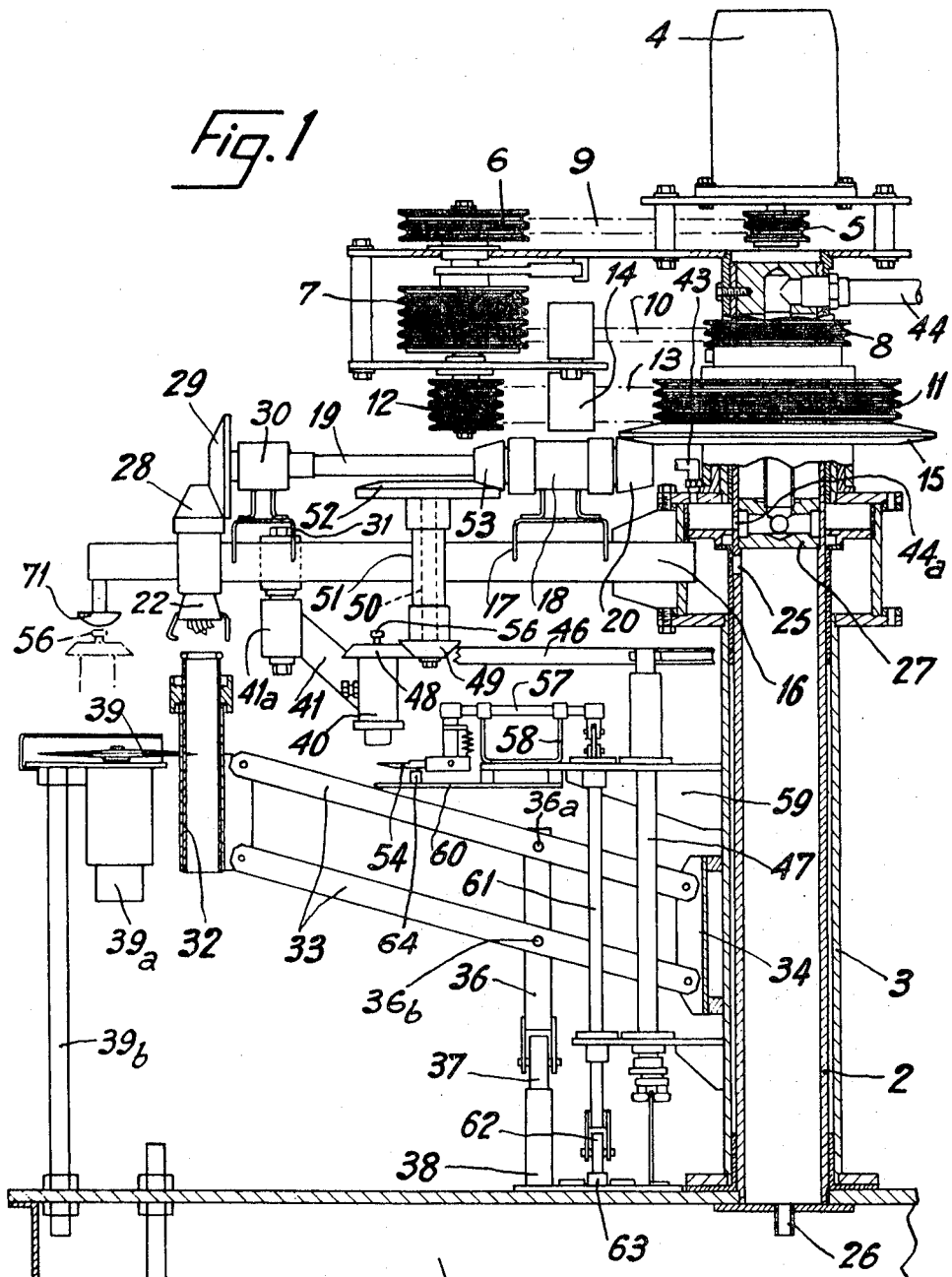
FIG. 1 is a fragmentary general view in vertical section of an apparatus embodying the invention.

Referring first to FIG. 1, the apparatus comprises a bedplate 1 having mounted on it a hollow central column 2 receiving a rotating system 3 bearing a number of working units serving to prepare artichoke bottoms; a detailed description of one such unit will be given hereinafter.

The system 3 is driven by a central motor 4 secured to the top of the column 2 and providing the drive via a reducer comprising pulleys 5 to 8 and belts 9, 10. Disposed at the top of the system 3, coaxially of the column 2, is a large pulley 11 driven, via a belt 13 tensioned by a jockey wheel 14, by a pulley 12 forming part of the reducer. The pulley 11 outputs a drive with a change of direction, e.g. by way of a conical bearing surface 15 via which the required rotations are imparted to the various rotating members of the working units. Accordingly, each unit comprises a radial arm 16 having on it a support member 17 having a double bearing 18 receiving a radial shaft 19 terminating, at the end near the column 2, in a cone 20 engaging with the pulley surface 15.

As can be seen more clearly in FIG. 2a, the arm 16 terminates in a bush 21 having mounted in it a readily releasable rotating blowing head 22 whose hollow shaft is formed with apertures 23 via which pressure fluid is supplied from a duct 24 which is fashioned in the arm 16 and which extends to a slot 25; that slot is in the column 2 and serves as a fluid distributor. The fluid is brought to the column through a central tube 26 shown in FIG. 1. A partition 27 separates the bottom part of the column 2, such part serving as a pressure-fluid reservoir, from the top part of the column 2.

The blowing head 22 is rotated via a transmission which changes the line of drive and which comprises a pinion 28 rigidly secured to its shaft and a crown wheel 29 rigidly secured to the shaft 19. The shaft 19 is mounted, at the end near the head 22, in a bearing 30 borne via a support member 31 on the arm 16.

Referring now to FIGS. 2a and 3, the blowing head 22 comprises a hollow casing from which two rows 22a, 22b of parallel nozzles extend; the nozzles of the row 22a extend axially of the axis of head rotation, and the nozzles of the row 22b extend inclinedly in relation to such axis. The head 22 also has two arms 22—c, 22d which are disposed laterally thereof and in extension of its free end and which are shaped to suit their function— i.e. removal of the final bracts. Advantageously, the arms 22c, 22d are hollow so that they can supply blowing nozzles 70c, 70d at their ends. Preferably, the nozzle 70c extends radially and the nozzle 70d extends tangentially.

As FIGS. 2a and 2b show, the artichoke is supported by a vertical tubular member 32 articulated, as can be seen in FIG. 1, to two parallel arms 33 themselves articulated to a support member 34 forming part of the system 3, to form a deformable parallelogram serving as a means of moving the tubular holder 32 parallel to itself. The artichoke A has its stem or stalk 35 engaged in the holder 32. The height thereof can be varied to bring the artichoke opposite the various tools in operation; the height variation is produced by a rod 36 pivotally connected at places 36a, 36b to arms 33 which are parallel to the holder 32; the rod 36 terminates in a roller 37 running on a cam 38 borne by the bedplate 1.

Referring to FIG. 2a, when the artichoke A comes near the blowing head 22, an appropriate facility starts the blowing operation. The fluid streams from the nozzles 22a, 22b separate the outer bracts which spread out, then penetrate below the central bracts covering the choke. The choke is then expelled rapidly. The artichoke bottom, which has continued to move towards the blowing head 2, has removed from it (FIG. 2b) first the final scraps of choke by the central jets and second the final peripheral bracts by the side arms 22c, 22d, the latter extending around the artichoke bottom during this phase of the operation. The arms 22c, 22d have a mechanical and aerodynamic action, the aerodynamic action resulting from the fluid streams delivered from the nozzles 70c, 70d.

Having been cleaned by the blowing head 22, the artichoke bottom is gripped by a gripping device in the form of a suction means or sucker 40 mounted on a support 41 rotatable around a vertical spindle 41a so disposed on the arms 16 as to be brought in vertical alignment with the holder 32 at the required time. As FIG. 4 shows, the sucker 40 has a spigot 42 via which, and via a flexible pipe 42a, the sucker 40 can be connected to a negative pressure source 43 supplied through a line 44 received in the top part of the column 2; the column being provided with a distributing orifice 44a shown in FIG. 1.

The artichoke bottom is then cut off flush with the stem by a knife 39 (FIG. 1) driven by a motor 39a mounted on a column 39b secured to the bedplate 1. Before being engaged by the sucker 40 and cut off from the stem, the artichoke bottom is centered by movable lateral abutments 45 which can be seen in FIG. 4 and which are disposed around the holder 32.

The support member 41 can be orientated by linkage 46, 47 adapted to move the sucker 40 between the position described, in which it engages the artichoke bottom, and an operative position, in which a gearwheel 48 rigidly secured to the sucker is engaged with a drive gearwheel 49 secured to a shaft 50 mounted on a support member 51 borne by the arm 16, the shaft 50 terminating in a conical disc 52 which engages with a conical roller 53 on the shaft 19. By means of this mechanism, the artichoke bottom can be rotated around itself for machining by a blade 54, in a manner to be described hereinafter.

Figure 4:
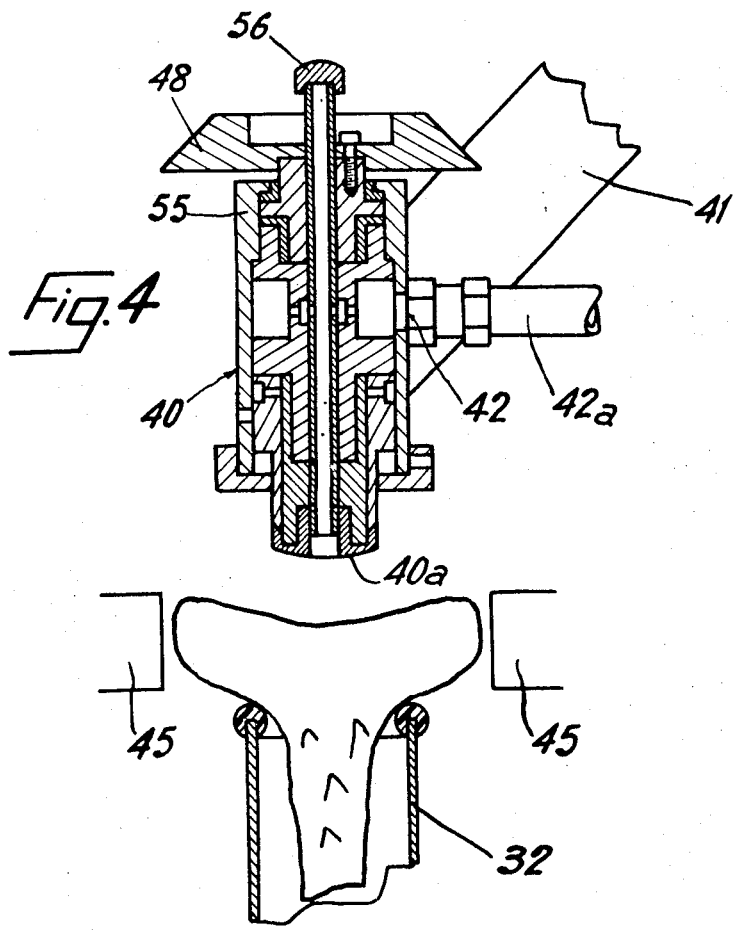
FIG. 4 is a sectioned view of the gripping device.

As FIG. 4 shows, the sucker 40 is mounted in a sleeve 55 which is rigidly secured to the member 41 and which bears the vacuum connection line 42. The sucker 40 has a perforate head 40a having a convex base in which a central ejector 56 can move downwards under the control of a cam 71 shown in FIG. 1.

A machining means or facility comprises the blade 54 which is mounted on a spindle 57 adapted to articulate and rotate while bearing on a cam 64 rigidly secured to a support member 58 slidable on a bracket 69 forming part of the system 3 (FIG. 1). The support 58 can be moved by a feeler finger 60 which contacts the artichoke bottom, to ensure that the blade 54 removes very little substance from the artichoke bottom. The shaft 57 is moved by a linkage 61 terminating in a roller 62 running on a cam 63 rigidly secured to the bedplate 1.

Figure 5:
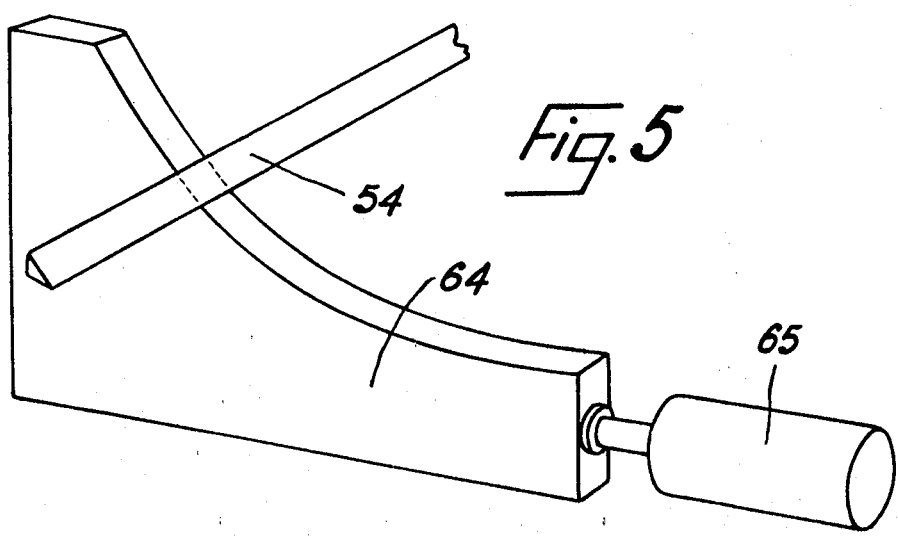
FIG. 5 is a diagrammatic perspective view showing a detail of the bottom "machining" station.

As can be seen in FIG. 5, the path described by the blade 54 is determined by a moving cam or template 64 which is associated with the blade 54 and which is moved by the finger 60 via e.g. a reciprocating actuator 65.

Figure 6:
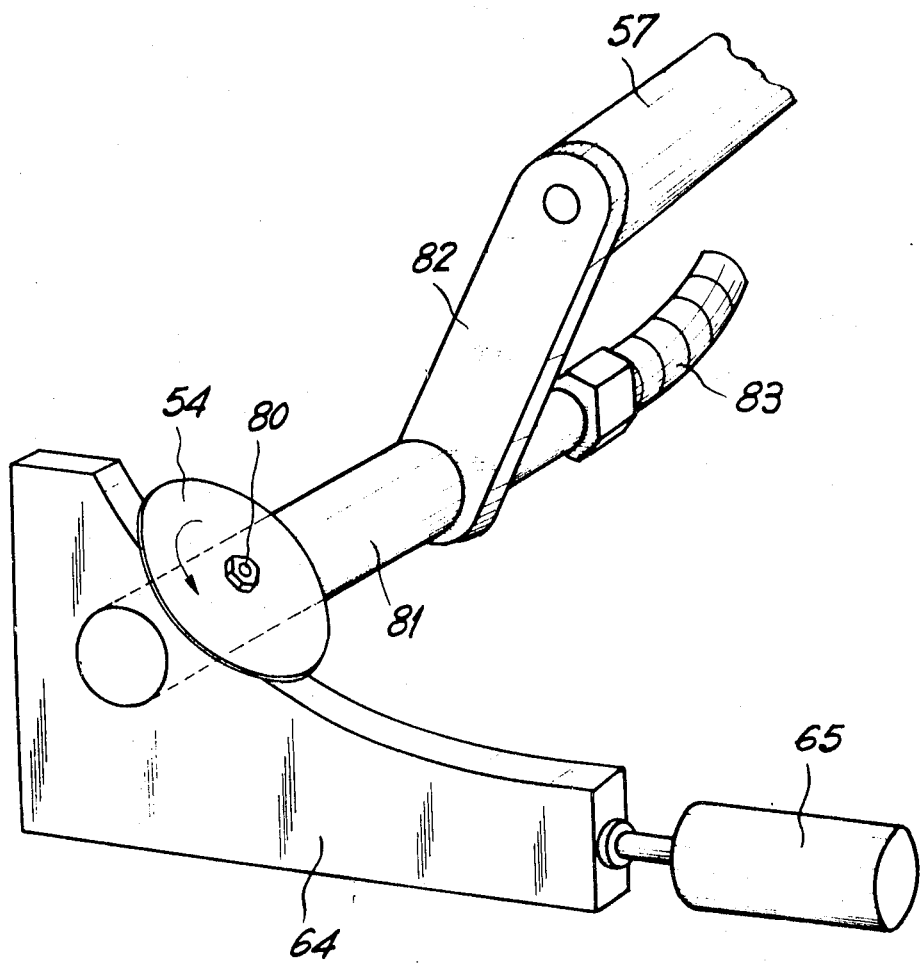
FIG. 6 is a diagrammatic perspective view of a first constructional variant of the blade of the machining device.

Referring to FIG. 6, which is similar to FIG. 5, there can be seen the moving cam or template 64 whose position can be adjusted by the actuator 65 in dependence upon the dimensions of the workpiece, for instance, an artichoke bottom. The blade 54 is mounted on a shaft 80 perpendicular to a hollow blade-holder 81 mounted on the shaft 57 with the interposition of an arm 82. The blade 54 is rotated by a flexible transmission 83 terminating at a direction-changing transmission (not shown) received in the blade holder 81.

Operation of the machine is believed to be apparent from the foregoing description.

The machine has a number of stations identical to the station just described and disposed roundabout-fashion around the central column 2. The moving system 3 comprising these stations runs at a uniform speed. During each revolution a particular sector is allotted to the placing of the artichokes in the holders 32, and other sectors are allotted to the blow cleaning of the artichoke bottom, to the severance of the bottom from the stem and to engagement of the bottom by the sucker, to machining of the bottom and to ejection thereof.

Referring to FIG. 7, a vertical shaft 90 bears a stationary support member 91 having mounted on it a motor 92 whose shaft drives a pulley 93 associated with a belt 94 which also runs over a pulley 94 rigidly secured to the blade 54 which in this case takes the form of a domed member rotatably mounted on the shaft 90 and adapted to be driven fairly fast, for example, at from 500 to 1500 r.p.m. Also mounted on the shaft 90 is a rotatable spider 96 bearing a number of pairs of double arms 97 which are parallel in pairs and between which a rocking shaft 99 is mounted on a pin 98 perpendicular to the shaft 90; the shaft 99 is associated with a rotating support 100 of the sucker 40 serving to retain the product to be turned. The sucker 40 picks up the product from a dished member 101 which brings the product into the operative range of the sucker 40 as it rotates, synchronously with the spider 96, around a shaft 102 parallel to the shaft 90. The blade 54 rotates around its shaft 90 without displacement, and when the spider rotates, the sucker support 100 moves, while rotating around itself, to bring the product into the operative range of the blade 54. This movement and rotation are under the control of a cam 103 borne by columns 104 extending from the stationary support 91.

When the spider 96 rotates, the sucker support 100 rubs on the edge of the cam 103 and rotates around itself on its shaft 99; simultaneously, because of the shape of the cam 103, the support 100 oscillates around the pin 98 to move the product to be turned into the operative range of the blade 54, in the direction indicated by an arrow f. The cam edge describes a kind of helix traced on a truncated cone and calculated for correct machining of the product.

Modifications can of course be made to the embodiments hereinbefore described, inter alia by the substitution of equivalent technical means, without for that reason departing from the scope of this invention as defined in the claims.

An apparatus for preparing the receptacles and fruits of bractated plants, more particularly artichoke bottoms, comprising a support for the receptacle, a blowing head including nozzles directed at the bracts for removing the leaves and the choke from the receptacle, sucker means for picking up the receptacle bottom from the support after such bottom has been cleaned by the blowing head, and machining means for removing irregularities in the shape of the bottom caused by removal of the leaves.

2. An apparatus as set forth in claim 1, wherein the receptacle support is a tubular member for receiving the receptacle stem.

3. An apparatus as set forth in claim 1, wherein the blowing head is adapted to rotate around its axis.

4. An apparatus as set forth in claim 1, wherein the blowing head has multiple nozzles.

5. An apparatus as set forth in claim 4, wherein the blowing head has two rows of nozzles disposed in a central part thereof, the nozzles of one of said rows extending axially and the nozzles of the other row extending inclinedly, the blowing head also having a pair of side arms.

6. An apparatus as set forth in claim 5, wherein the side arms have nozzles whose ends extend radially in one case and tangentially in the other.

7. An apparatus as set forth in claim 1, wherein the blowing head is mounted on an arm which also bears a support for the sucker means.

8. An apparatus as set forth in claim 7, wherein the sucker means support is pivotally mounted on the arm so as to be able to bring the sucker means either within the operative range of the receptacle support, to pick up the receptacle bottom therein, or into engagement with a mechanism for rotating the sucker means around itself to enable the receptacle bottom to be machined.

9. An apparatus as set forth in claim 8, including movable abutments which are adapted to locate the receptacle bottom when the same is being picked up by the sucker means.

10. An apparatus as set forth in claim 8, wherein the mechanism for rotating the sucker means around itself is mounted on the arm and has a shaft which is also used to rotate the blowing head around itself.

11. An apparatus as set forth in claim 1, wherein the machining means comprises a blade whose operative position is determined by a feeler contacting the receptacle bottom.

12. An apparatus as set forth in claim 11, wherein the feeler is adapted to move a template or cam or the like serving as a guide for the blade.

13. An apparatus as set forth in claim 11, wherein the blade is rotatable.

14. An apparatus as set forth in claim 13, wherein the blade is rotatable around a spindle borne by a support compelled to move along a template or cam which the feeler moves.

15. An apparatus as set forth in claim 1, wherein the machining means comprises a blade in the form of a domed member rotatable about its axis, and including a support member for the receptacle adapted to rotate around itself and to oscillate around an axis perpendicular to the axis of the domed member, to bring the receptacte within range of the blade.

16. An apparatus as set forth in claim 15, wherein the support member is mounted on a spider coaxial of the blade, the support member being movable by a cam on which the support member can roll as the spider rotates.

17. An apparatus as set forth in claim 1, including a bedplate having a central column receiving a rotating system supporting a working unit comprising the receptacle support, the sucker means and the machining means, said rotating system also supporting members for controlling the operations of said receptacle support, sucker means and machining means.

18. An apparatus as set forth in claim 17, wherein the receptacle support is supported by the rotating system by means of a parallelogram linkage which compels such support to move parallel to itself, said apparatus also including linkage cooperating with a cam mounted on the bedplate for moving the parallelogram linkage.

19. An apparatus as set forth in claim 18, including further linkage cooperating with another cam mounted on the bedplate to control operation of the machining means.

20. An apparatus as set forth in claim 17, including a knife for severing the stem from the receptacle flush with the receptacle support.

21. An apparatus as set forth in claim 17, wherein the movement of the rotating system and the movements of the blowing head and of the sucker means are derived from a central motor mounted on the column.

22. An apparatus as set forth in claim 17, wherein the column is hollow and serves for the supply of pressure fluid to the blowing head and for connecting the sucker means to a source of negative pressure.

23. An apparatus as set forth in claim 17, including a plurality of such working units supported by the rotating system symmetrically and in roundabout-fashion around the central column.

* * * * *